Figure 1:
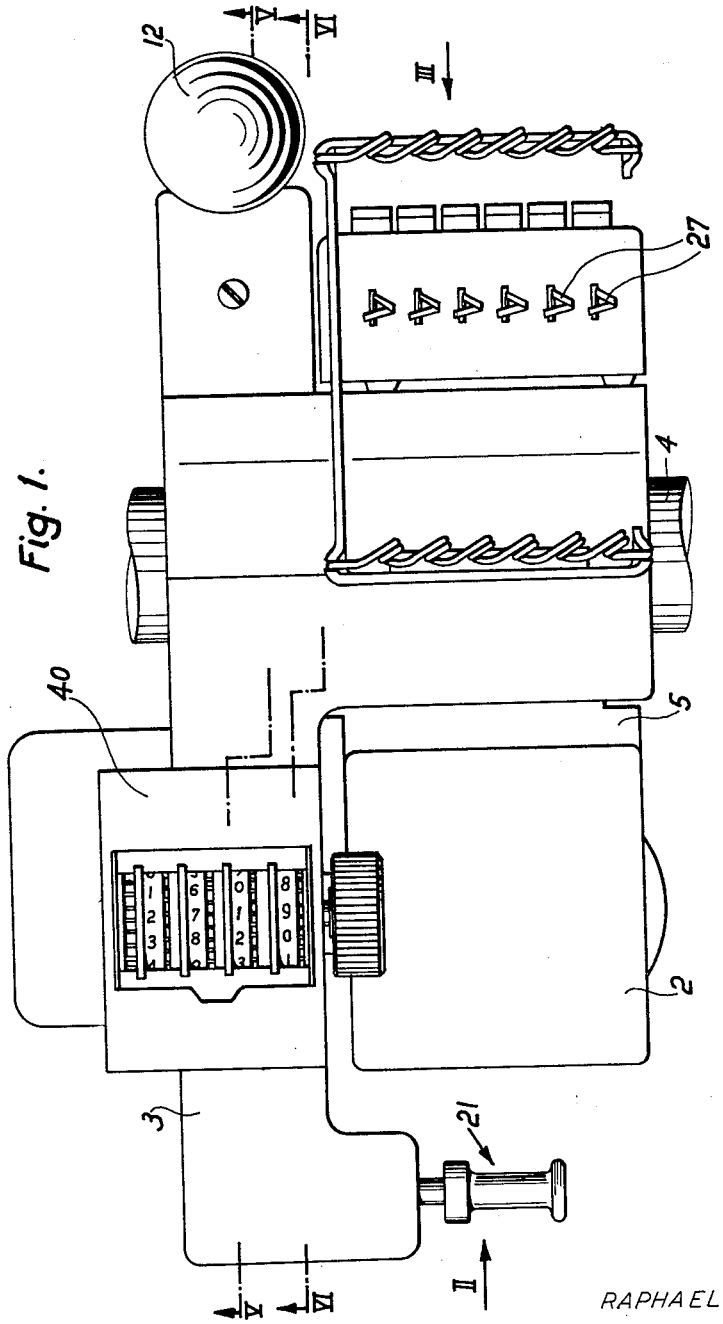

INVENTOR.
RAPHAEL WEISS
BY
Woodhams, Blanchard & Flynn
ATTORNEYS

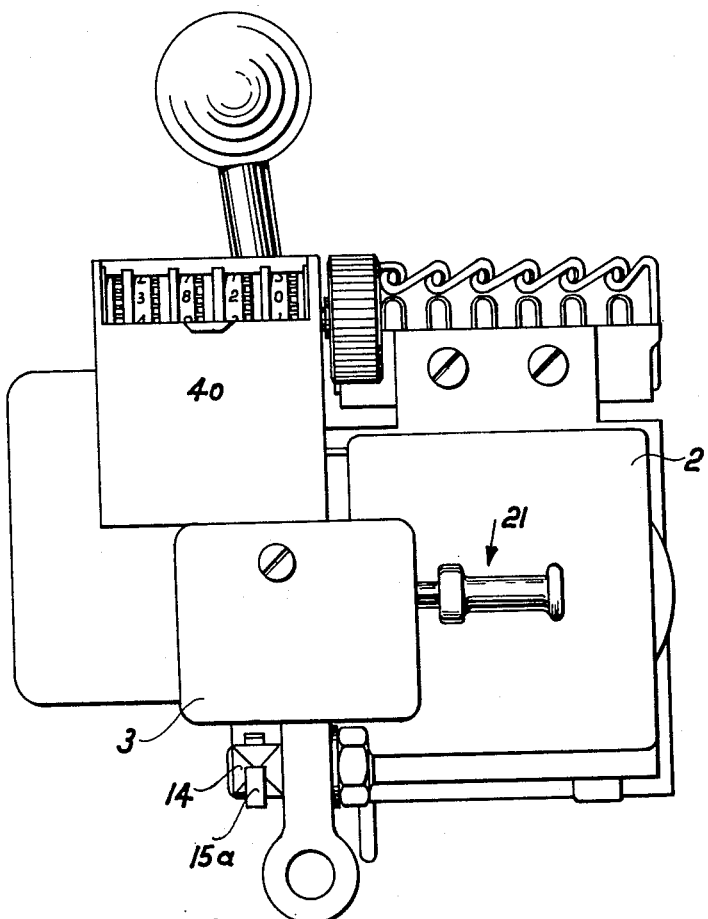

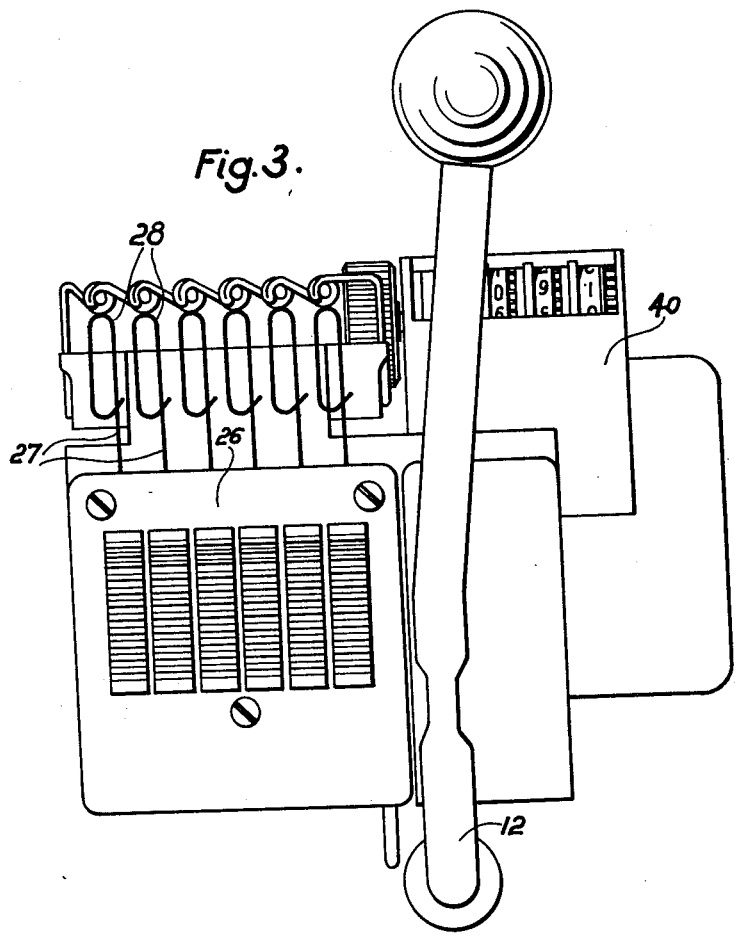

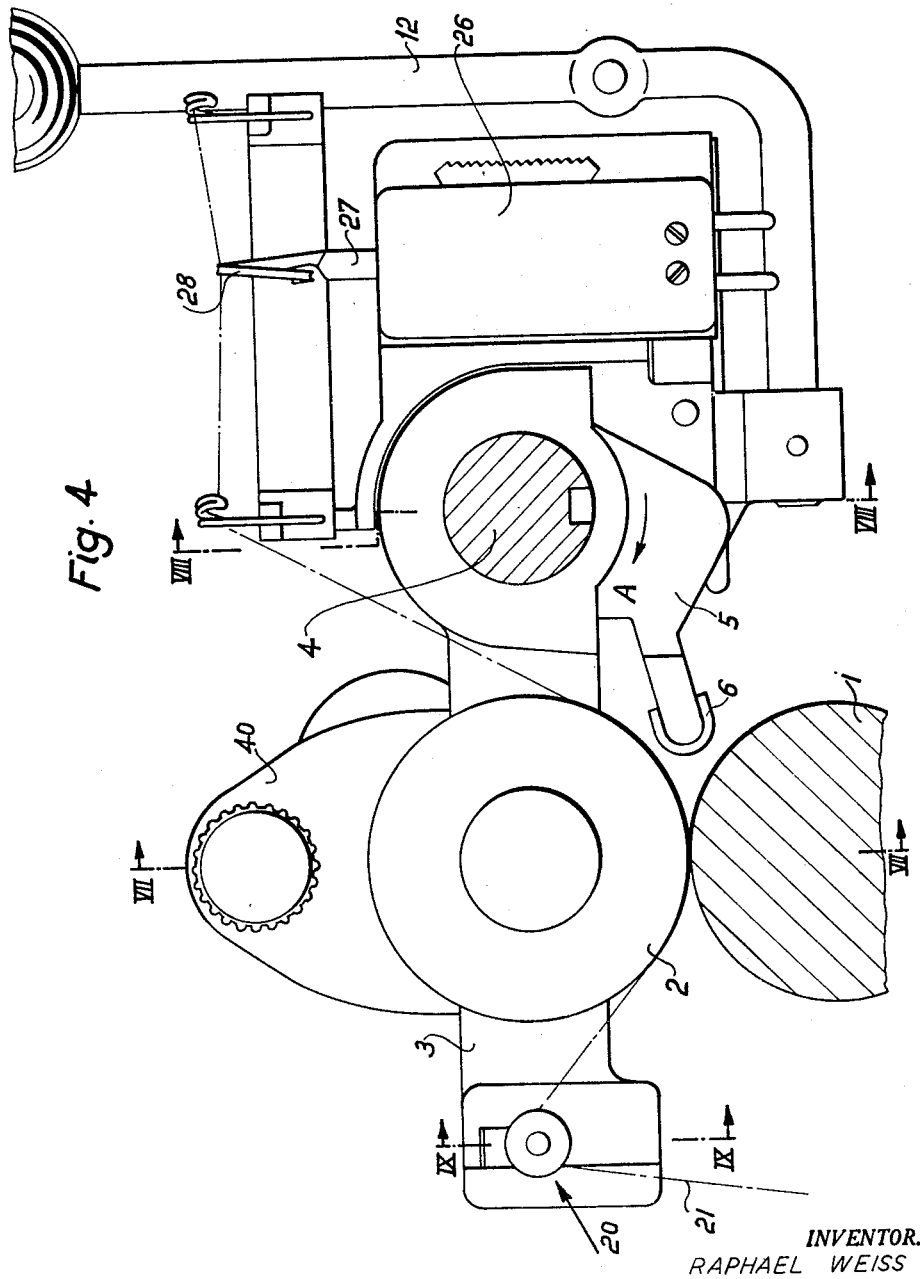

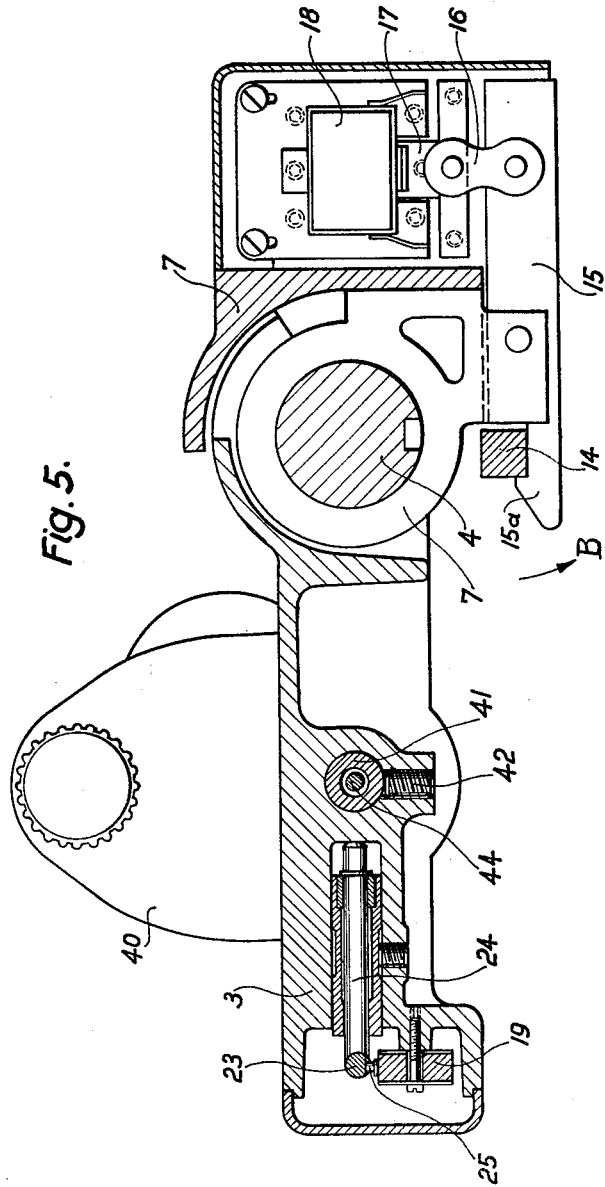

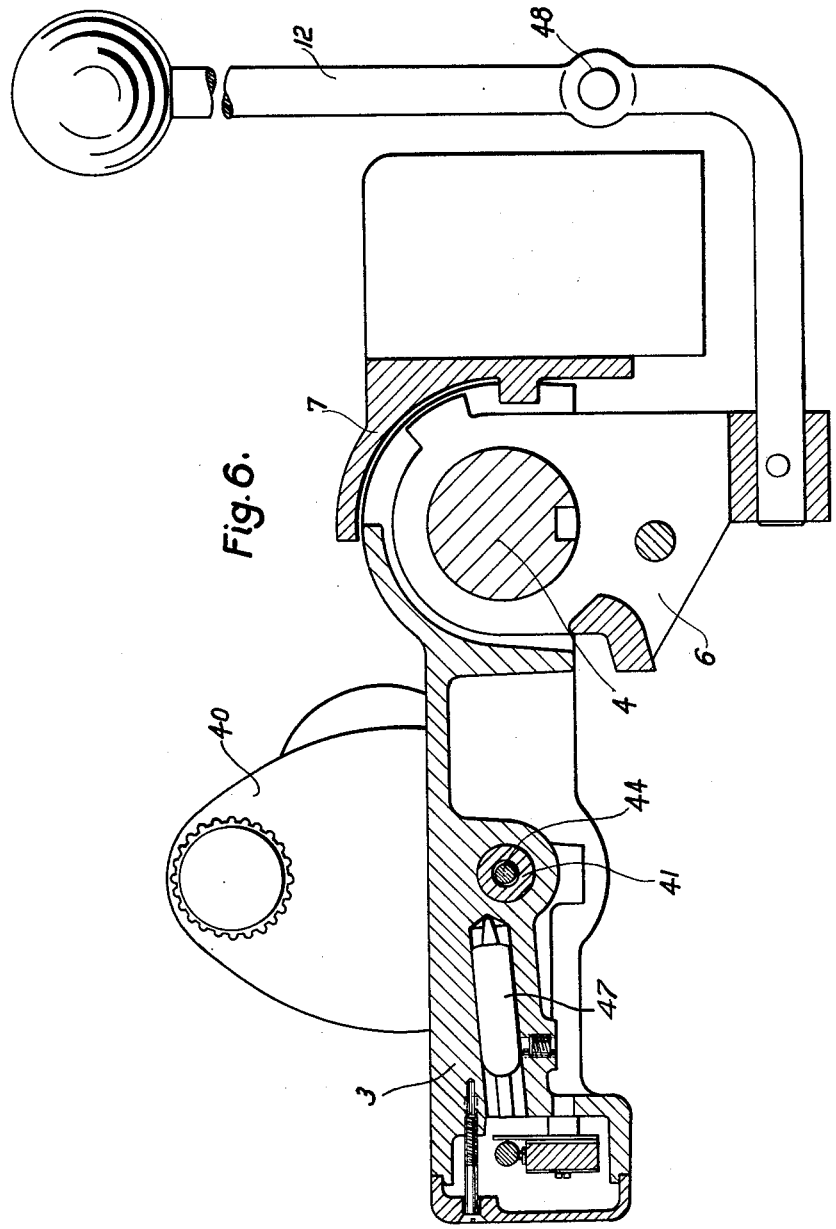

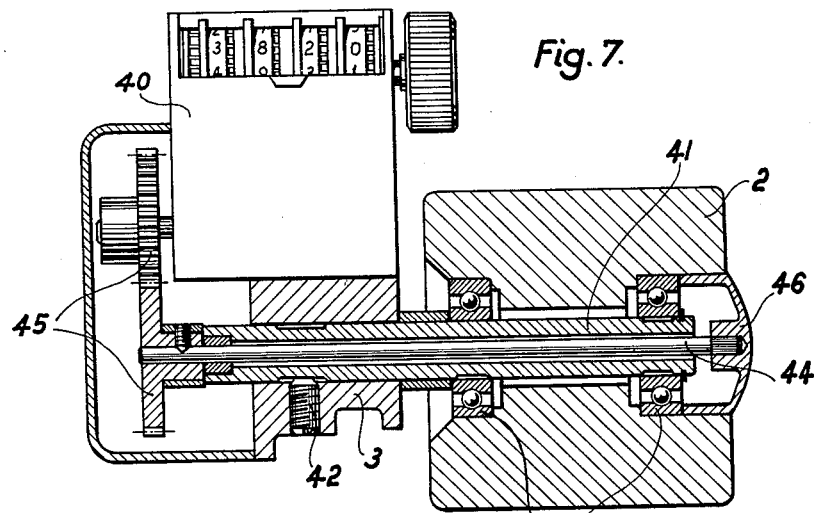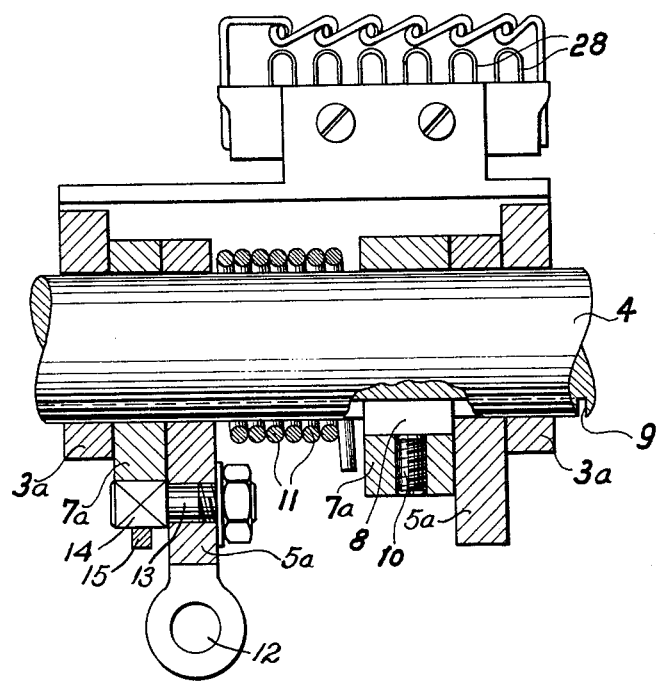

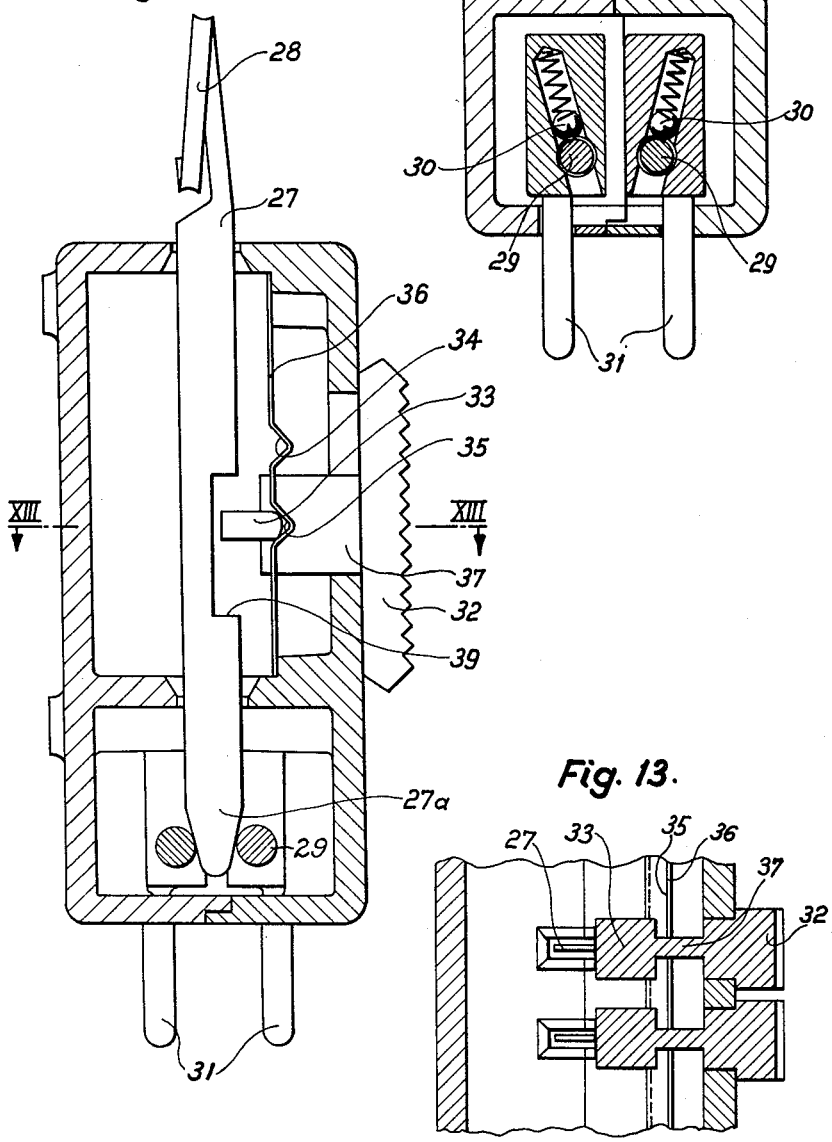

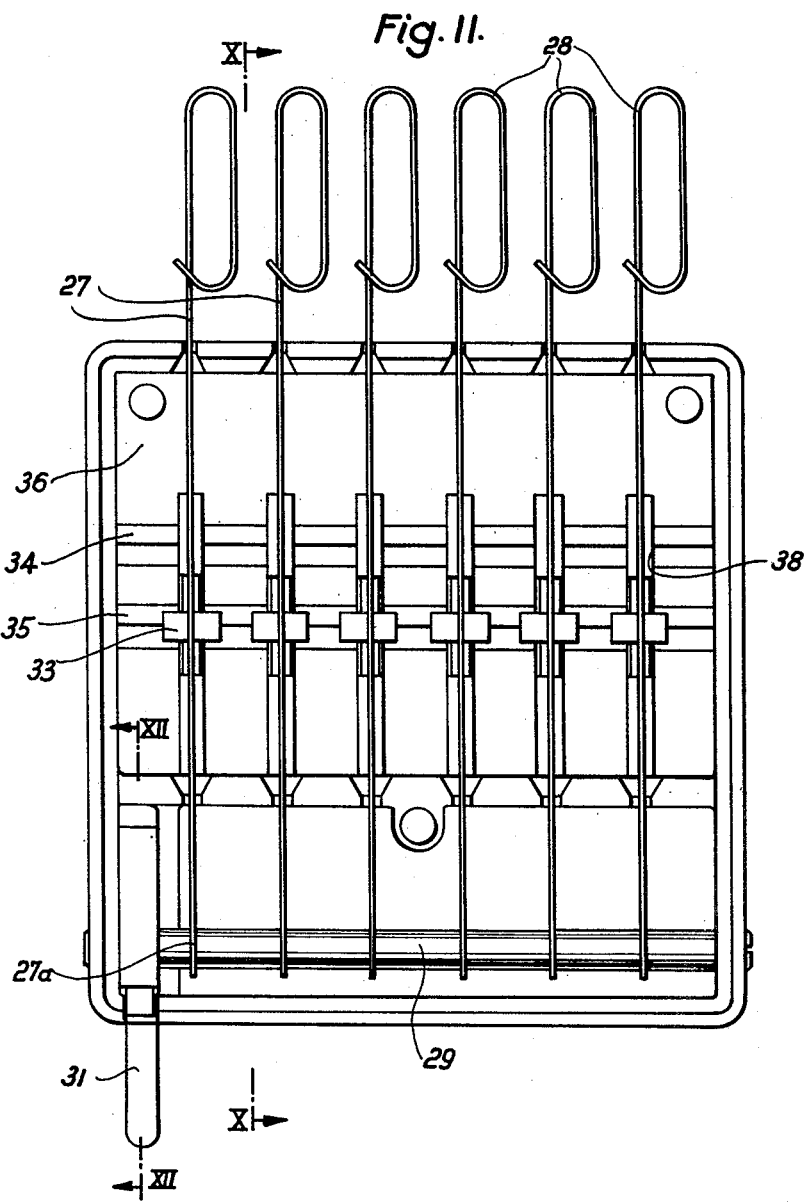

United States Patent Office 3,163,977
Patented Jan. 5, 1965

3,163,977
AUTOMATIC KNOCK-OFF DEVICE FOR TWISTING FRAME DELIVERY MECHANISM
Raphael Weiss, Kempten, Allgau, Germany, assignor to Allma, Allgaüer Maschinenbau G.m.b.H., Kempten, Allgau, Germany, a corporation of Germany
Filed May 29, 1963, Ser. No. 284,122
7 Claims. (Cl. 57—84)

The present invention relates to a means for lifting the pressure roller of the delivery mechanism of twisting frames or the like in the event of the yarn breaking, comprising a spring-loaded support lever, which lifts the pressure roller upon release of a locking means, and at least one feeler lever, which is held by the yarn or thread in its operative position and causes the release of the locking means when the thread or yarn breaks. With the prior known arrangements of this type, the support lever is locked in its operative position by a lever system connected mechanically to the feeler lever. Acting in opposition to this locking action is the force of the spring, which presses the support lever against the pressure roller when the thread breaks. The spring pressure causes a friction in the locking means, and this friction must be overcome by the weight of the feeler lever. For this reason, the feeler lever must be made comparatively heavy, so that it causes the release of the thread-locking means by its weight. However, the weight of the feeler lever bears on the travelling thread and therefore causes an additional tensioning or stressing in the thread. It is consequently necessary to keep the weight of the feeler lever as low as possible. However, this can only be achieved if the friction in the locking means is reduced by selecting a smaller spring force. However, this has the disadvantage that the stop mechanism responds more slowly. The weight of the feeler lever can also be reduced by making its lever arm longer. When the thread breaks, however, this longer lever arm must travel a larger distance, whereby the release of the stop mechanism is also delayed. Due to the plurality of levers which are necessary with the hitherto known strictly mechanical stop mechanisms, these are not only costly to manufacture, but are also comparatively susceptible to interruption. The construction of the prior known stop mechanisms is also particularly complicated if the threads entering the supply mechanism are to be supervised by dropping needles or dropping weights.

It is an object of the present invention to overcome the defects of the prior known arrangement. This is achieved according to the invention by the fact that an electromagnet is provided for releasing the locking mechanism and the feeler lever or levers or similar thread control members co-operate with electric contacts which are connected into the control circuit of the electromagnet. The new arrangement renders possible a rapid and accurate lifting of the pressure roller of the supply mechanism. The rapid lifting is particularly achieved by the fact that a comparatively strong spring can be provided for the support lever. The higher friction consequently being set up in the locking mechanism can be easily overcome by the electromagnet. For this reason, the feeler levers or similar control members can be made as light as desired, so that the thread or threads are not subjected to stress. By dispensing with the lever system necessary for the locking action, the new stop mechanism is of simple design and it has in addition the advantage of great reliability in operation.

Other advantages and also details of the invention are more fully explained by reference to one constructional example shown in the drawings, wherein:

FIG. 1 is a plan view of the new arrangement,
FIG. 2 is a front elevation thereof looking in the direction of the arrow II of FIG. 1,
FIG. 3 is a rear view of the arrangement looking in the direction of the arrow III of FIG. 1,
FIG. 4 is a side elevation,
FIG. 5 is a longitudinal section on the line V—V of FIG. 1,
FIG. 6 is a longitudinal section on the line VI—VI of FIG. 1.
FIG. 7 is a cross-section on the line VII—VII of FIG. 4,
FIG. 8 is a cross-section on the line VIII—VIII of FIG. 4,
FIG. 9 is a cross-section on the line IX—IX of FIG. 4,
FIG. 10 is a cross-section through a dropping lever box on the line X—X of FIG. 11,
FIG. 11 shows the same in elevation with the cover removed,
FIG. 12 is a partial section on the line XII—XII of FIG. 11,
FIG. 13 is a partial section on the line XIII—XIII of FIG. 10.

In the drawings, the reference 1 represents the bottom cylinder of the supply mechanism of a twisting frame. The top cylinder or the pressure roller 2 is arranged to be rotatable on a supporting arm or bearing bracket 3. This bearing bracket 3 has a pair of bearing eyes 3a which are pivotably mounted on a bearing shaft 4, which is arranged fast in the machine frame. A pivotable support lever 5 is also provided with a pair of bearing eyes 5a which are pivotably mounted on the bearing shaft, the free end of said lever carrying a lifting tongue 6. A housing 7 is also arranged on the bearing shaft 4, and this housing has a pair of bearing eyes 7a which are nonrotatably connected to the said shaft 4 by means of a key 8 which engages in a keyway 9 of the shaft 4. The key is pressed by a screw 10 into the keyway 9, so that a displacement of the housing 7 is also no longer possible after the screw 10 has been tightened. It is to be noted that the bearing eyes 5a and 7a are mounted between the two bearing eyes 3a.

The support lever 5 is under the action of a spring, which is preferably constructed as a helical spring 11, as shown in the drawing, and is arranged coaxially around the bearing shaft 4. Because of its bias, the spring 11 has the tendency to rotate the support lever 5 in the direction A around the bearing shaft and to press it against the pressure roller 2. By means of a hand lever 12, the support lever 5 can be pivoted downwardly, whereby the spring 11 experiences an even stronger tension. In order that the support lever 5 remains in its lower position, a locking means is provided, the details of which can be seen from FIGS. 5 and 8. The support lever 5 comprises a bolt 13, which ends in a square section 14. A two-armed locking lever 15 is pivotally arranged in the housing 7. One end of the locking lever comprises a locking nose 15a, while the other end is connected by a link 16 to the tension pin 17 of an electromagnet 18. When current flows to the electromagnet, the right end of the locking lever 15 is lifted, whereby the locking nose 15a is pivoted downwardly in the direction B and the square portion 14 of the bolt 13 is freed. The support lever can therefore swing upwardly in the direction A in this case.

In order to set the electromagnet 18 in operation, a low current supply installation of for example 24 volts alternating current can be provided. Arranged in the control circuit of the electromagnet 18 is a switch 19, which co-operates with a feeler lever 20. The feeler lever 20 in this case supervises the discharging thread. As can be seen from FIG. 4, the discharging thread 21, coming from the pressure roller 2, is guided upwardly over the roller 22 of the feeler lever 20. The roller 22, which can consist of porcelain or sintered ceramics, is preferably arranged to be interchangeable on the shank 23 of the feeler lever 20, so that it can be replaced by another when it has become worn. Serving to support the roller is a leaf spring 24a (FIG. 9) arranged axially of the feeler lever shank 23. As is to be seen from FIGS. 5 and 9, the feeler lever 20 is pivotally mounted in the bearing bracket 3 about a shaft 24 arranged at right angles to the shaft of the pressure roller. The feeler lever shank 23 is supported on a spring-loaded pressure pin 25 of the switch 19. Due to the tension of the thread, the feeler lever 20 is pulled downwardly, so that also the pressure pin 25 is urged downwardly. In this position of the pressure pin, the circuit to the electromagnet 18 is broken. If the thread tension now ceases due to the thread breaking, the feeler lever 20 can deflect upwardly, whereby the circuit is closed by means of the switch 19. The electromagnet 18 then attracts the locking lever 15, as described above, and the support lever 5 is freed for rocking movement. Due to the force of the spring 11, the support lever quickly moves upwardly and bears with its lifting tongue on the pressure roller 2. Due to the spring force, the pressure roller 2 is pivoted upwardly about the bearing shaft 4 together with the bearing bracket 3. By this means, the supply of thread is stopped, since now there is no clamping action of the thread between the bottom cylinder 1 and pressure roller 2. Simultaneously with the lifting of the pressure roller 2, the thread on the latter is clamped by means of the lifting tongue 6 and the pressure roller 2 is braked by the friction on the lifting tongue 6. The thread is thus unable to wind either around the bottom cylinder 1 or around the pressure roller 2.

With twisting machines or frames, it is not only necessary to supervise the discharging thread, but it is also necessary to supervise the entering separate threads, since otherwise an incorrect twist would be produced in the event of an entering individual thread breaking. In order to supervise the entering individual threads, a novel dropping needle box 26 is provided, which is equipped with a plurality of upwardly and downwardly movable dropping needles 27. Each of these needles comprises at its upper end a thread-guiding eye 28, through which the entering thread is guided. The dropping needles 27 or the needle box 26 is so constructed that when a thread breaks, the needle 27 falls and touches two contacts which are connected into the control circuit of the electromagnet 18 and which are short-circuited with one another by the said needles 27, whereby there is also produced a release of the locking means and thus a lifting of the pressure roller 2.

More details regarding the dropping needle box are to be seen from FIGS. 10–13. Each of the dropping needles 27 comprises a current-conducting material, at least at its lower end. However, the entire needle is preferably made of sheet metal and has a rectangular cross-section. At their bottom ends 27a, the needles 27 are made wedge-shaped. Extending over the full width of the box are two contact bars 29 which are preferably arranged to be rotatable in the box. The contact bars 29 are provided, insulated from one another, in the circuit of the electromagnet 18. In order that a conductive connection is always provided upon rotation of the contact bars, the current supply takes place by way of a spring-loaded ball 30, as shown in FIG. 12. The current supply takes place at the two plugs 31. The advantage of the contact bars being mounted for rotation is that these can be turned a certain amount when they become dirty or charred, so that always a satisfactory clean contact point is provided.

The operation of the novel dropping needle box is as follows:

The needles 27 are shown in their lower position in FIGS. 10 and 11 and in this position the two contact bars 29 are short-circuited by the wedge-shaped end 27a of the needle 27. However, the needles only occupy the position illustrated when the thread breaks. Normally, they are held by the thread tension in their upper position, as shown in FIG. 4, so that they do not come into contact with the contact bars 29.

Since it is not always necessary to have the six dropping needles which are illustrated, it is expedient to provide a retaining means for the needles, which hold the latter in their upper position. The retaining means consist in the constructional example illustrated of a slide member 32 which engages by means of a projection 33 in the indentations 34 or 35 of a leaf spring 36. The slide member 32 projects with its stem 37 through a slot 38 of the leaf spring 36. Each of the dropping needles is provided with its own slide member, so that the said needles can be secured independently of one another. The projection 33 engages in a similar recess 39 of the dropping needle 27, the recess being made sufficiently large for the needle to be able freely to move upwardly and downwardly when the slide member 32 is in its lower position. In the upper position of the slide member 32, on the contrary, the needle 27 is supported on the projection 33 and cannot come into contact with the contact bars 29.

In order that the needles 27 may be easily replaced in the event of becoming worn or damaged, it is advantageous that their cross-section is substantially constant and is not enlarged towards the bottom end. The needles can then easily be removed by the needle being extracted in an upward direction from the needle box. For this purpose, it is merely necessary to pull the slide member 32 outwardly against the force of the spring 36, so that the projection 33 does not obstruct the extraction of the needle. The needle box therefore does not have to be taken apart for replacing the needles. Similarly, an arresting of the individual needles from outside is possible by means of the slide member 32. The wedge-shaped formation of the ends 27a of the needles causes a comparatively high bearing pressure on the contact bars 29 and accordingly produces a satisfactory contact with needles which are of low weight. The small weight of the needles means that the travelling thread is not subjected to stress. The dropping needles, like the roller of the feeler lever, can be removed and fitted without any tool.

In order to stop the pressure roller 2 after a certain yardage of the travelling thread has been reached, a yardage counter 40 can also be provided. In the constructional example illustrated, the pressure roller 2 serves simultaneously as a metering wheel. As can be seen from FIG. 7, the bearing shaft 41 is fixed in the bearing bracket 3 by means of the screw 42. The pressure roller 2 can be arranged by means of ball bearings 43 so as to be rotatable on the said shaft 41. In the constructional example illustrated, the bearing shaft 41 is constructed as a hollow shaft and has a driving shaft 44 which is provided coaxially thereof and which is connected through a toothed wheel gearing 45 to the counter mechanism. The cap 46, which consists of elastic material, produces the connection between the driving shaft 44 and the pressure roller 2. The counter mechanism 40 is so designed that it closes a contact after an adjustable number of yards has been reached, this contact being arranged in the circuit of the electromagnet 18. When the set number of yards has been reached, the locking means is then released by the electromagnet and the pressure roller is lifted. On the other hand, when there is breakage of the thread, it is also possible by means of the counter to establish what length of thread had already been twisted before the thread broke, if the counter is set at "0" when starting the twisting operation.

Current is supplied to the electromagnet 18 by all formerly described thread-control members such as feeler levers, dropping needles and counter mechanism, which can be provided in combination or even individually on the supply mechanism. The current is expediently switched off by a mercury contact tube 47, which is provided in the bearing bracket 3. The mercury contact tube is so arranged that it closes the circuit to the electromagnet when the bearing bracket 3 is in the normal operative position. However, if the bearing bracket 3 is lifted by the support lever 5, the circuit is broken by the mercury contact tube and thus the electromagnet is again switched off. The disturbing sparks when the circuit is broken are taken up by the mercury switch tube.

As will be seen from FIG. 6, the lever 12 has an eye 48. This eye 48 is connected through a rod (not shown) to the spindle brake, so that the spindle brake is actuated with deflection of the lifting tongue.

By way of amplification, it is also to be mentioned that with the new arrangement, the pressure of the pressure roller on the bottom cylinder is regulated according to the thread tension. As can be seen from FIG. 4, the thread is guided over the feeler lever 20. Since the feeler lever 20 is arranged on the pivotable bearing bracket 3, the latter is loaded by the thread tension and this loading increases as the thread tension increases. As a result, an increased pressure of the pressure roller on the bottom cylinder is produced, which is proved to be advantageous, since it is not possible in many cases to avoid slipping when the pressure is constant and the thread tension is high.

In order that the pressure roller 2 operates satisfactorily, it must be in contact over its full width with the bottom cylinder 1. However, the position of the pressure roller 2 depends on different manufacturing tolerances, which frequently cannot be maintained or the maintenance of which would also be too costly. For this reason, it is desirable to make the shaft 41 of the pressure roller 2 so that it is adjustable in relation to the bottom cylinder 1. For this purpose, the shaft 41 is bent slightly through a few degrees at the point where it is fitted in the bearing arm 3. After releasing the screw 42, it is possible to rotate the shaft 41 in the bracket 3, whereby the shaft 41 can be so adjusted in relation to the bottom cylinder that the pressure roller contacts the latter over its full width.

I claim:

1. Apparatus for moving the pressure roller of the supply mechanism of twisting frames or the like upon breaking of a thread, comprising:
   a machine frame;
   a bearing shaft mounted on the machine frame;
   a bearing bracket pivotally mounted on said bearing shaft;
   a pressure roller rotatably mounted on said bearing bracket;
   a spring-urged movable support lever pivotally mounted on said bearing shaft and engageable with said pressure roller for effecting movement of same;
   a housing mounted on said bearing bracket and fixed against rotation with respect thereto;
   electromagnetically operable means mounted in said housing and including locking means engageable with said support lever for normally holding said support lever spaced from said pressure roller;
   at least one feeler engageable with the thread and connected to said electromagnetically operable means so that operation of said electromagnetically operable means is responsive to the condition of the thread and serves to release said locking means from engagement with said support lever.

2. Apparatus according to claim 1, in which the bearing bracket, the support lever and the housing each are provided with two bearing eyes through which the bearing shaft extends, the bearing eyes of the support lever and housing being disposed between the bearing eyes of the bearing bracket.

3. Apparatus according to claim 2, in which the bearing shaft had a lengthwise groove therein, and at least one of the bearing eyes of the housing has a key mounted therein and extending into the groove.

4. Apparatus according to claim 2, in which a coil spring surrounds the bearing shaft between one of the bearing eyes of the support lever and one of the bearing eyes of the housing, one end of the coil spring bearing on the support lever and the other end of the coil spring bearing on the housing.

5. Apparatus according to claim 1, in which the machine includes a bottom cylinder and the pressure roller is mounted on a second shaft which is releasably fixed at one end to the bearing bracket, said second shaft being bent through an angle of a few degrees at the point where it is secured to said bearing bracket so that when said second shaft is released from fixed connection to the bearing bracket, it can be rotated with respect to the bearing bracket so that the pressure roller can be positioned parallel to the bottom cylinder.

6. Apparatus according to claim 1, in which the feeler is mounted on the free end of the bearing bracket, said feeler being mounted on a shank which is engageable with the movable control element of a switch which is connected for controlling energization of said electromagnetically operable means.

7. Apparatus according to claim 6, in which the feeler is a roller over which the thread runs, and a leaf spring extending axially along the shank and engaging said roller and holding same on said shank.

References Cited in the file of this patent

UNITED STATES PATENTS

| | | |
|---|---|---|
| 1,481,982 | Brace et al. | Jan. 29, 1924 |
| 1,668,435 | Urlaub | May 1, 1928 |
| 1,735,102 | Arragg | Nov. 12, 1929 |
| 1,777,503 | Remington | Oct. 7, 1930 |
| 1,840,642 | Stone | Jan. 12, 1932 |
| 2,044,238 | Arragg | June 16, 1936 |
| 2,444,553 | Cone | July 6, 1948 |
| 2,844,860 | Ayars et al. | July 29, 1958 |
| 3,019,587 | Weiss | Feb. 6, 1962 |
| 3,029,588 | Davis | Apr. 17, 1962 |